C. W. FORD.
POTATO DIGGER.
APPLICATION FILED JUNE 6, 1910.
1,006,926.
Patented Oct. 24, 1911.
2 SHEETS—SHEET 1.
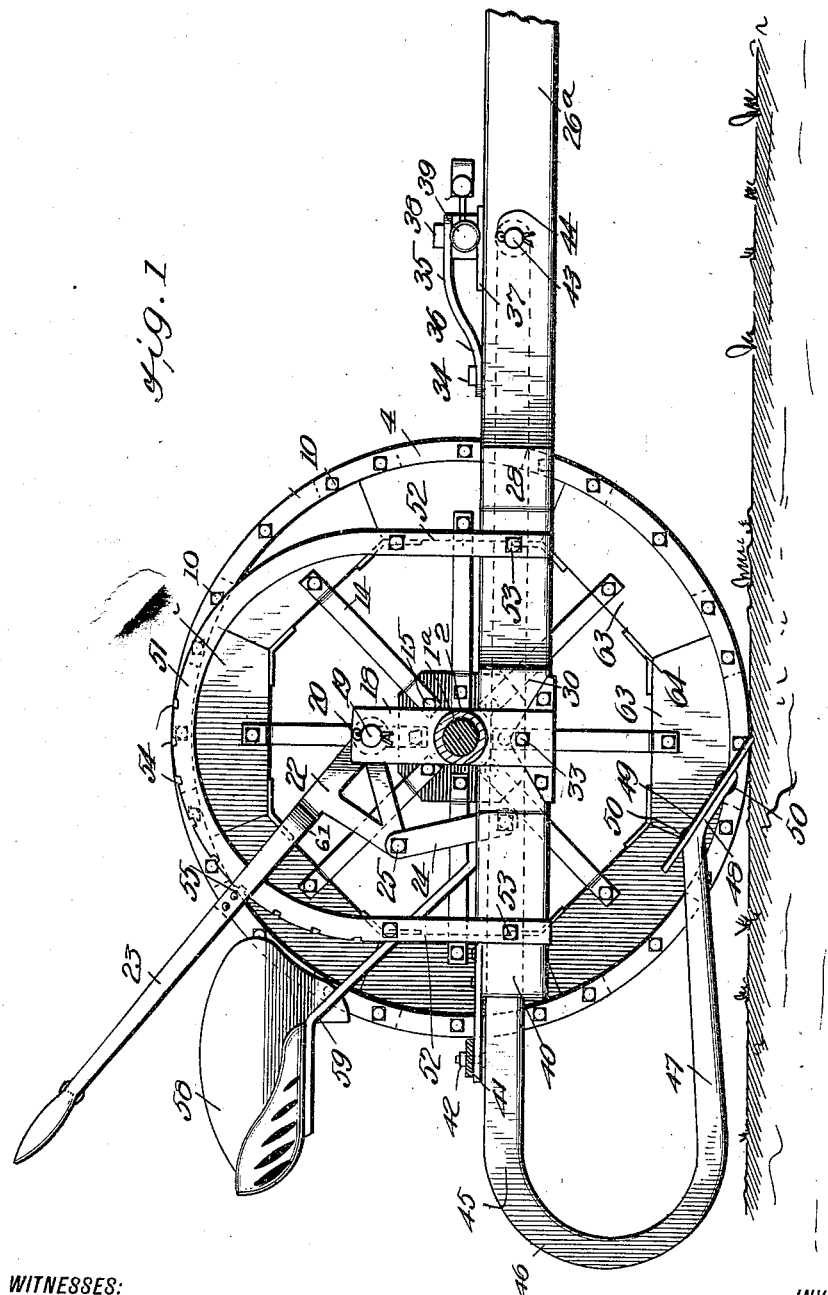
WITNESSES:
F. C. Barry
C. E. Train
INVENTOR
Clayton W. Ford
BY Munn & Co.
ATTORNEYS

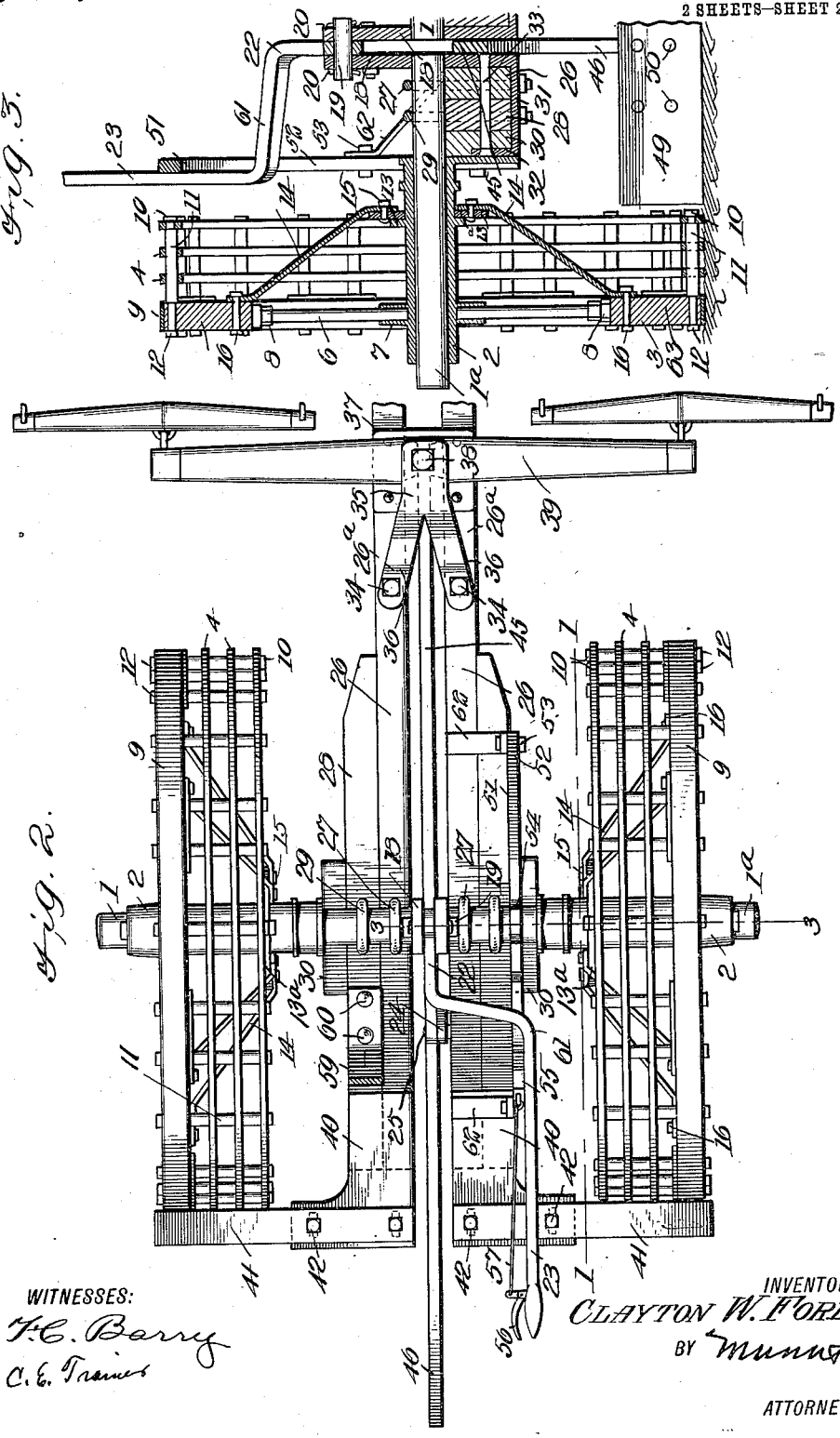

UNITED STATES PATENT OFFICE.

CLAYTON WARREN FORD, OF FINDLAY, OHIO.

POTATO-DIGGER.

1,006,926.   Specification of Letters Patent.   Patented Oct. 24, 1911.

Application filed June 6, 1910. Serial No. 565,369.

*To all whom it may concern:*

Be it known that I, CLAYTON W. FORD, a citizen of the United States, and a resident of Findlay, in the county of Hancock and State of Ohio, have made certain new and useful Improvements in Potato-Diggers, of which the following is a specification.

My invention is an improvement in potato diggers, and consists in certain novel constructions, and combinations of parts, hereinafter described and claimed.

Referring to the drawings forming a part hereof, Figure 1 is a section on the line 1—1 of Fig. 2, Fig. 2 is a plan view, and Fig. 3 is a section on the line 3—3 of Fig. 2.

The embodiment of the invention shown in the drawings, consists of a shaft composed of two alined sections 1 and 1$^a$, spaced apart at their adjacent ends, and each section has journaled on its outer end the hub 2 of a wheel to be described.

Each wheel is composed of the hub 2, and a felly 3 connected to the hub by spokes 6, the spokes engaging radial bosses 7 near the outer end of the hub. The felly 3 is provided with bosses 8 for receiving the outer ends of the spokes, and a rim or tire 9 encircles the said felly. A plurality of rings 4 are arranged coaxial with the rim and at the inner side thereof, and the said rings are spaced apart from the felly and from each other, and are connected to each other and to the felly at spaced intervals by bolts 10, a spacing sleeve 11 encircling each bolt between the inner ring and the felly, and the bolts are engaged by nuts 12 to secure the parts together. The hub is provided near its inner end with a radial flange 13 against which abuts a ring 13$^a$ encircling the hub, and braces 14 are secured at one end to the ring by bolts 15, and at the other to the felly by bolts 16. A vertical plate 18 is secured to the inner end of each section of the axle, each of the said plates having an opening at approximately its center to receive the section, and the plates are connected at their upper ends by a pin 19, having at each end a transverse opening engaged by a cotter pin 20.

A triangular rocker 22 has one of its corners pivoted on the bolt between the plates, a lever 23 extending integrally from another corner, and to the third corner is pivoted one end of a link 24 by means of a bolt 25. A frame is connected with the axle, the frame consisting of two sections, one of which is connected with each section of the axle. Each of the frame sections consists of a bar 26 arranged adjacent to the plate 18 and having an eye bolt 27 encircling the axle section, the said bar extending behind and in front of the axle, and being prolonged in front as at 26$^a$ to form with the prolongation of the other bar, a tongue whereby the machine may be drawn.

Adjacent to the axle each bar 26 is reinforced by a second shorter bar 28, approximately equal in length to the diameter of a wheel, and also provided with an eye bolt 29 encircling the axle section. A block 30 is arranged alongside of the outer side of each bar 28, adjacent to the axle, and each plate 18 at its lower end is provided with a lateral extension 31 extending beneath the bars and block, and having an angular portion 32 fitting a recess in the outer face of the block.

A bolt 33 passes through the angular portion 32, the block 30 and the bars 26 and 28 and the plate 18, the plate and angular portion being countersunk to receive the hood of the bolt and the nut, so that the head is flush with the inner face of the plate 18, and the nut is flush with the outer face of the angular portion 32. In front of the bars 28, the bars 26 are connected by a clevis 35 having a branch 36 secured to each bar, by a bolt 34, and a double tree 39 is arranged between the end of the clevis and a plate 37 connecting the bars 26, and is secured in place by a bolt 38 extending through clevis, double tree, and plate. A bearing 40 incloses the rear ends of each bar 26 and its reinforcing bar 28, and an arm 41 is bolted to the upper face of the bearing and the bars by bolts 42, and extends laterally beyond the outer face of each of the wheels, the edge of the arm being arranged closely enough to the periphery of the wheel to scrape accumulation of dirt therefrom, but not so closely as to interfere with the running of the same.

Adjacent to the double clevis, a journal pin 43 is arranged transversely of the bars, and the ends of the pins are engaged by cotter pins 44. A bar 45 is pivoted at its front end on the journal pin, and the said bar extends rearwardly, between the bars 26, and the plates 18, to and beyond the rear of the frame. Behind the frame the bar is curved downwardly at 46, and forwardly at 47, substantially parallel with the body of the bar, the free end of the bar having an angular portion 48 at its free end. The bar gradually tapers from the beginning of the curve to the angular portion, and the said portion is arranged at an obtuse angle with respect to the bar.

A shovel or blade 49 is secured to the upper face of the angular portion by bolts or rivets 50, the free edge of the blade engaging the ground directly below the axle. The lower end of the link 24 before mentioned is pivoted to the body portion of the bar, to the rear of the longitudinal center thereof, and it will be evident that when the lever is swung, the bar and the shovel or plow will be raised or lowered, depending upon the direction of movement of the lever.

A substantially semicircular bar 51 has the arms 52 secured to one of the frame sections by bolts 53, and the said bar is provided with spaced notches 54, for engagement by a tooth 55, slidable on the lever 23, and operated by a grip 56 pivoted to the lever, and connected to the tooth by a link 57, whereby to retain the lever in adjusted position.

A seat 58 is supported in rear of the lever by a spring plate 59, secured at one end to a frame section by bolts 60, and at the other to the seat. The lever 23 is offset from the plane of the rocker, as indicated at 61 in Fig. 2, and moves along the opposite face of the bar 51 from the said rocker, and the bar is braced against the frame section on its inner side by braces 62.

The fellies of the wheels are composed of sections 63, arranged end to end, as shown in Fig. 1, and angle plates 64 connect the adjacent ends. The braces 14 before mentioned are connected with the sections, and are in register with the spokes. The wheel construction prevents clogging, and is easily cleaned, since the soil can pass through between the rings, and but little of it is carried up.

In operation the digger is drawn through the field, with the blade or plow a sufficient depth to pass below the potatoes, and as it moves along, the potatoes are lifted from the ground. During transportation, the plow may be lifted out of the ground, and by means of the lever it may be held at any desired depth. The arrangement of the beam of the plow moving between the frame sections, prevents any lateral swinging movement of the said beam with respect to the frame, so that the plow is held directly in the row. It will be noticed that the width of the felly of the wheel is greater than that of the rings.

I claim—

1. A potato digger comprising an axle composed of alined sections spaced apart at their adjacent ends, a plate secured to the inner end of each axle and extending above and below the same, a pin connecting the apex end of the plates, a substantially triangular rocker having one corner journaled on the pin, and having a lever integral with another corner, a sectional frame, one section being connected with each axle section, the frame sections being connected at their front ends, a bar pivoted at one end between the frame sections and in front of the axle sections, a link connecting the other corner of the rocker with the bar, said bar curving downwardly and forwardly at its rear end, a plow connected with the free end of the bar, means for holding the lever in adjusted position, a wheel on the outer end of each axle section, and a tongue connected with the frame.

2. A potato digger comprising a sectional frame, an axle section secured to each frame section, the axle sections being in alinement and spaced apart at their inner ends, a bar pivoted at one end between the frame sections in front of the axle sections, said bar being curved downwardly and forwardly at its rear end, a plow secured to the free end of the bar, means for raising and lowering the bar and a wheel journaled on each axle section.

3. A potato digger comprising a frame composed of sections spaced apart laterally from each other, a bar pivoted at one end between the sections at the front end thereof, said bar curving downwardly and forwardly at its rear end, a plow on the free end of the bar, means for raising and lowering the bar, and a wheel on each section, the plow being directly below the axis of the wheels.

4. A potato digger comprising a frame composed of sections spaced apart laterally from each other, a bar pivoted at one end between the sections at the front end thereof, said bar curving downwardly and forwardly at its rear end, a plow on the free end of the bar, means for raising and lowering the bar, and a wheel on each section.

5. A potato digger comprising a sectional frame, alined stub axles secured to the frame, a wheel journaled on the outer end of each axle, a bar pivoted between the frame sections, means for adjusting the bar, and a plow connected with the bar.

CLAYTON WARREN FORD.

Witnesses:
FRANK P. BLACKFORD,
CHARLES A. BLACKFORD.